United States Patent [19]

Koyama et al.

[11] Patent Number: 4,882,176

[45] Date of Patent: Nov. 21, 1989

[54] METHOD FOR MOLDING CONFECTIONERY PRODUCTS

[76] Inventors: Kazuya Koyama, No. 6-26-16, Minami-Kasai; Edogana-ku, Tokyo; Yoshimasa Yokoyama, No. 2-5-3-194, Sumiyoshi-Higashi-machi Higashi-Nada-ku, Kobe, Hyogo-ken, both of Japan

[21] Appl. No.: 189,309

[22] Filed: May 2, 1988

[30] Foreign Application Priority Data

| | | | |
|---|---|---|---|
| May 2, 1987 | [JP] | Japan | 62-109472 |
| Dec. 4, 1987 | [JP] | Japan | 62-308030 |

[51] Int. Cl.[4] .......... A23G 3/30

[52] U.S. Cl. .......... 426/5; 426/512; 426/524

[58] Field of Search .......... 426/512, 515, 517, 414, 426/5, 524; 425/407, 547

[56] References Cited

U.S. PATENT DOCUMENTS

| | | | |
|---|---|---|---|
| 1,878,585 | 9/1932 | Kalmeijer | 425/308 |
| 2,156,810 | 5/1939 | Garbutt | 426/517 |
| 2,166,568 | 7/1939 | Kuhlke | 426/414 |
| 2,405,149 | 8/1946 | Kempthorn | 425/522 |
| 2,632,202 | 3/1953 | Haines | 425/532 |
| 3,338,998 | 8/1967 | Settembrini | 425/536 |
| 3,857,963 | 12/1974 | Graff et al. | 426/3 |
| 3,861,851 | 1/1975 | Schiemann | 425/535 |
| 4,282,258 | 8/1981 | Forkner | 426/512 |
| 4,413,461 | 11/1983 | Waldstrom | 426/515 |
| 4,426,402 | 1/1984 | Kaupert | 426/515 |
| 4,474,717 | 10/1984 | Hendry | 264/DIG. 83 |
| 4,543,769 | 1/1985 | Schmitz | 426/284 |

*Primary Examiner*—George Yeung
*Attorney, Agent, or Firm*—Price, Gess & Ubell

[57] ABSTRACT

A method and apparatus of molding confectionery products such as chewing gum to facilitate their removal from the mold. The apparatus is provided for cooling the product while in the mold such that the product's surface freezes or substantially hardens. This method allows sticky products to be easily removed from injection molds via ejector pins.

5 Claims, 1 Drawing Sheet

FIG. 1
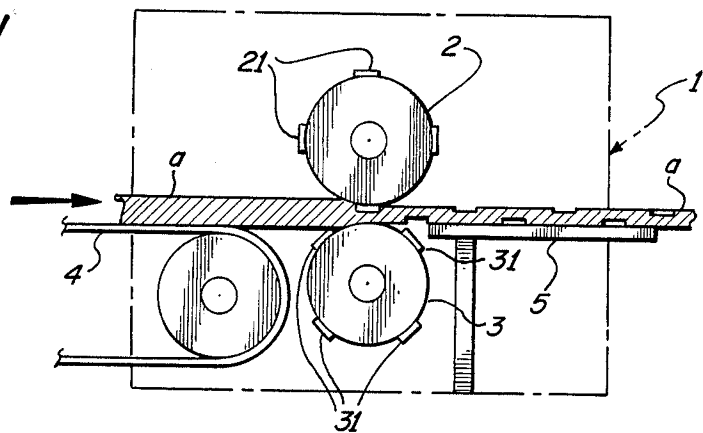
FIG. 2
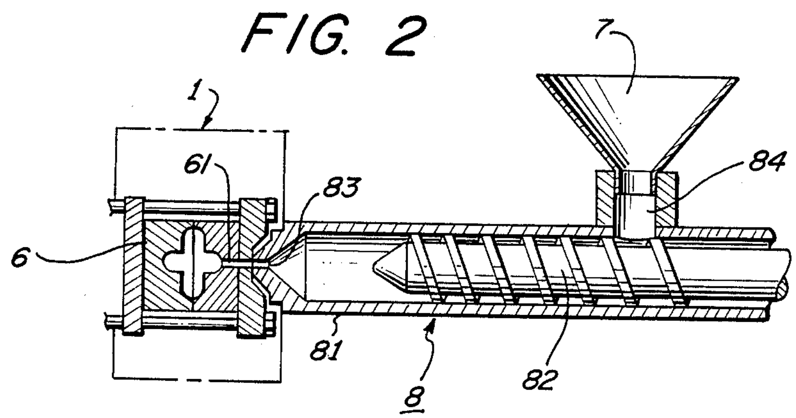
FIG. 3
FIG. 4
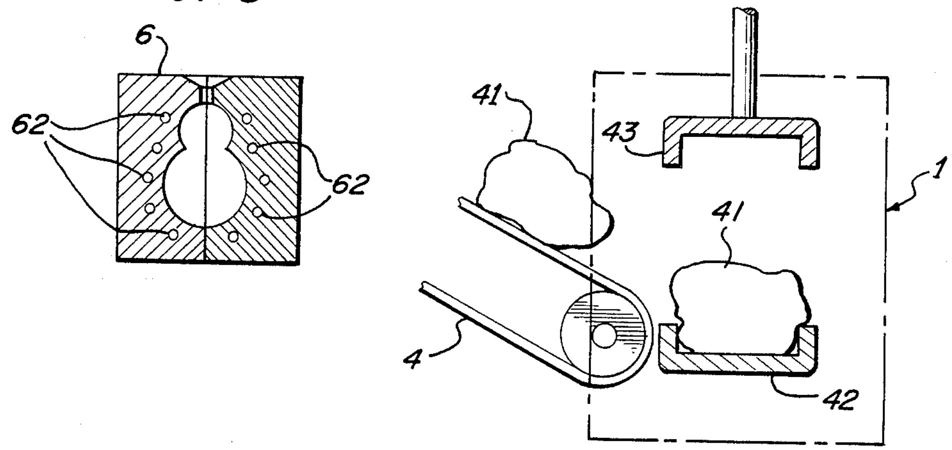

METHOD FOR MOLDING CONFECTIONERY PRODUCTS

BACKGROUND OF THE INVENTION

1. Field of the Invention

This invention relates generally to methods and apparatus for the manufacture of formed edible products and, more particularly, pertains to a method and apparatus for removing solid edible products from a mold such as chewing gum.

2. Description of the Prior Art

In the process of producing edible products, it is often desirable to form them into complex three-dimensional shapes by a molding process. Demolding becomes a problem when the product is inherently tacky or sticky. Such problems occur when molding, for example, chewing gum, candy or chocolate containing gelatin or sugar.

The existing technology pertaining to the molding of chewing gum is described in Tokukosho No. 60-9776. The publication describes an injection molding process in which the surface temperature of the chewing gum is cooled off to approximately 68° F. to 86° F. while inside the mold prior to its removal therefrom. In addition, a release agent such as talc, cornstarch, sugar, ester or wax is employed to further facilitate the removal from the mold. The same method has been employed in the manufacture of gluten candy by mixing the candy materials with the release agent or painting or spraying the release agent onto the inside of the two-piece mold.

The results obtained by employing the procedure of the prior art precludes mass production in an injection molding process, as the edible material remains difficult to remove from the mold by the use of ejector pins despite the reduced temperature and presence of the release agent. It is similarly difficult to remove chewing gum-like material from a mold utilizing a release agent in a rotary pressing production or from a mold with a three-dimensional pattern in a roller molding production. In addition, the release agents may have a detrimental effect on the edible product. For example, the use of oils or waxes can cause lipid peroxides to be deposited on the product. Some products become musty with the use of cornstarch as a release agent. The use of more sugar may make removal from the mold even more difficult. The use of release agents can pose health problems, as well as adulterate the original taste or reduce the shelf life of the edible products.

U.S. Pat. No. 2,156,810, issued to Frank Garbutt on May 2, 1939, discloses a method of forming ribbons of chewing gum using a rotary press positioned inside a refrigerated chamber.

SUMMARY OF THE INVENTION

It is an object of the present invention to provide an injection molding process and apparatus which facilitates readily removal of the molded product from the mold;

It is a further object of the present invention to provide a method of removing a molded edible product from a compression mold;

It is another object of the present invention to provide a method and apparatus to facilitate the mass production of a sticky edible product via an injection molding or compression molding process; and It is yet another object of the present invention to provide a method whereby three-dimensional molded shapes or shapes having raised or depressed lettering or other patterns can be easily removed from a mold.

According to the present invention, the foregoing and other objects are attained by a method in which the surface of a molded edible product is frozen or substantially hardened after the material is injected into an injection mold or after compression within a compression mold.

BRIEF DESCRIPTION OF THE DRAWINGS

Other objects and many of the attendant advantages of the present invention will be readily appreciated as the same becomes better understood by reference to the following detailed description when considered in conjunction with the accompanying drawings, in which like reference numerals designate like parts throughout the figures thereof, and wherein:

FIG. 1 illustrates a roller molding apparatus employing a method of the invention;

FIG. 2 illustrates an injection molding apparatus employing the method of the present invention;

FIG. 3 illustrates a cross-section of an injection mold; and

FIG. 4 illustrates a compression molding apparatus employing the method of the present invention.

DESCRIPTION OF THE PREFERRED EMBODIMENTS

The following description is provided to enable any person skilled in the food production field to make and use the present invention and sets forth the best modes contemplated by the inventors of carrying out their invention. Various modifications, however, will remain readily apparent to those skilled in the art, since the generic principles of the present invention have been defined herein specifically to provide an improved chewing gum molding method.

FIG. 1 illustrates one example of a roller molding apparatus in which the method of the present invention is employed. The molding rollers 2, 3 have the desired patterns 21 and 31 on their surface, and are set inside freezer 1. The temperature in the freezer is kept at 23° F. or lower. The chewing gum material a is pressed flat and long. Conveyor 4 supplies the gum material a running at a speed equivalent to that of the rollers 2, 3. Table 5 with a cutter (not shown) is on the side opposite the conveyor 4. The coolant for the freezer 1 is not specified, but can be liquid oxygen, liquid nitrogen or dry ice. The temperature to be maintained in the freezer is determined by the sugar content of the material a and the running speed of rollers 2, 3 such that the surface of the material a is frozen or substantially hardened when it issues from between the rollers 2, 3. In the production of chewing gum, it has been found that a freezer temperature of 5° F. to 14° F. is desirable for processing material 5 millimeters thick and running initially at a room temperature at a rate of 40 meters per minute. Since the surface of the material rapidly freezes in the freezer, the material is easily removed from rollers 2, 3 even with patterns 21, 31 imprinted on the surface of the material. In the FIG. 1 apparatus, it is also possible to spray coolant such as liquid nitrogen or liquid oxygen onto the material before it reaches the rollers 2, 3, or at the moment when it comes out of rollers 2, 3, instead of using freezer 1, so that at least the surface of the material is frozen when it is removed from rollers 2, 3.

FIG. 2 shows an example of an injection molding apparatus employing the method and apparatus of the present invention. Injection mold 6 is set in freezer 1, where the temperature is kept at 23° F. or lower. Pelleted or grainy chewing gum is added to hopper 7, where the feeding tube 84 conducts the material to the screw 82 of the injection machine 8. The material is heated to about 122° F. to 140° F. in heating tube 81 and injected from the injection nozzle 83 into mold 6 through a pouring hole 61. It is desirable to apply a very small quantity of a powder such as sugar, starch or talc to the grainy, edible material in order to avoid blockage in hopper 7. It is important that the temperature in freezer 1 is set such that the surface of the edible product in the mold is frozen by the time it is ready for removal. The total molding time must therefore be taken into consideration, i.e., from the time the material is poured into the mold to the time it is ejected therefrom. A variety of different coolants can be used such as, for example, liquid oxygen, liquid nitrogen or dry ice. Once the surface of the material has frozen or substantially hardened, the product is easily removed from the mold with the use of ejector pins (not shown). Grainy chewing gum was mixed with talc in a weight ratio of 50:1 and added to the hopper. A 40-mm-diameter screw 82 was rotated at a rate of 200 rpm to produce a compression ratio of 4.6:1 within the mold. The temperature in the heating tube 81 was held at 140° F., while the temperature within the freezer 1 was 8.6° F. This procedure allowed smooth, quick removal of the molded product via ejector pins.

Instead of locating the mold in freezer 1 as shown in FIG. 2, it is possible to build cooling passages 62 into the mold itself, as is illustrated in FIG. 3, and to continuously pass coolant therethrough during the molding process. It is preferable to use material with good heat conductivity for the mold 6, such as beryllium or tempered steel with hard chrome treatment. Such materials can be employed in the formation of complex three-dimensional molds.

Additionally, a tube could be inserted into the mold of FIG. 3 to inject compressed air to provide a hollow chewing gum product or, alternatively, to provide a candy interior.

FIG. 4 illustrates a compression molding apparatus in which the method of the present invention is employed. A conveyor 4 delivers a predetermined mass of the edible material 41 to the lower die 42, after which the upper die 43 is lowered to compress the material within the cavity described by the two dies. The dies can be placed inside the freezer 1 or, alternatively, have passages for coolant under their surfaces as in FIG. 3. The temperature of the freezer or the flowing coolant must be adjusted such that the surface of the product is frozen or substantially hardened during its residence time within the mold.

It is also possible to progressively apply pressure to the product through a series of molds from one with the simplest configuration to a final one with a final configuration with the inner capacity of each of the molding areas remaining the same, so that the solid edible material is carried forward from the mold with the simplest configuration to the one with final, complex configuration.

Obviously, many modifications and variations of the present invention are possible in light of the above teachings. It is therefore to be understood that, within the scope of the appended claims, the invention may be practiced otherwise than as specifically described.

What is claimed is:

1. In a method of injection molding chewing gum to provide a final product with a detailed molded outer surface, the improvement comprising the steps of:

supplying a mass of chewing gum at a temperature between 122° F. and 140° F. to an injection mold, freezing the surface interface of the chewing gum contacting the mold, and ejecting the molded chewing gum product while its surface is in a frozen state, whereby the separation of the chewing gum product from the mold, due to the frozen state of the chewing gum, ensures that the detailed outer surfaces of the chewing gum product are retained.

2. The improved method of claim 1 wherein the entire mold is placed in a refrigerated environment.

3. In a method of compression molding chewing gum to provide a product with a detailed outer surface, the improvement consisting of:

supplying a mass of chewing gum at a temperature between 122° F. and 140° F. to a compression mold;

supplying a quantity of liquid nitrogen coolant to the mold sufficient to cool the mold to a freezing temperature;

freezing the surface interface of the chewing gum with the mold, and ejecting the molded chewing gum product while its surface is in a frozen state, whereby the separation of the gum from the mold is sufficiently eased, due to the frozen state of the gum, such that the detailed outer surfaces of the chewing gum product are retained.

4. The improved method of claim 3 wherein the entire mold is placed in a refrigerated environment.

5. The improved method of claim 3 wherein the coolant is passed just beneath the mold surface.

* * * * *